US008831821B2

(12) United States Patent
Downs, Jr. et al.

(10) Patent No.: US 8,831,821 B2
(45) Date of Patent: Sep. 9, 2014

(54) CONTROLLER AREA NETWORK MESSAGE TRANSMISSION DISABLE TESTING SYSTEMS AND METHODS

(75) Inventors: Aubrey Walter Downs, Jr., Brighton, MI (US); Hanne Buur, Brighton, MI (US); David Dean Tarby, Chelsea, MI (US); James Mason Faucett, Novi, MI (US)

(73) Assignee: GM Global Technology Operations LLC

( * ) Notice: Subject to any disclaimer, the term of this patent is extended or adjusted under 35 U.S.C. 154(b) by 702 days.

(21) Appl. No.: 13/052,506

(22) Filed: Mar. 21, 2011

(65) Prior Publication Data

US 2012/0158240 A1 Jun. 21, 2012

Related U.S. Application Data

(60) Provisional application No. 61/424,410, filed on Dec. 17, 2010.

(51) Int. Cl.
*G01M 17/00* (2006.01)

(52) U.S. Cl.
USPC ....................................................... 701/33.7

(58) Field of Classification Search
None
See application file for complete search history.

(56) References Cited

U.S. PATENT DOCUMENTS

| | | | |
|---|---|---|---|
| 4,234,921 A | | 11/1980 | Kinoshita et al. |
| 5,333,268 A | * | 7/1994 | Douglas et al. ............... 709/244 |
| 5,345,155 A | | 9/1994 | Masaki et al. |
| 5,436,837 A | | 7/1995 | Gerstung et al. |
| 5,453,930 A | | 9/1995 | Imaseki et al. |
| 5,457,364 A | | 10/1995 | Bilotti et al. |
| 5,680,550 A | * | 10/1997 | Kuszmaul et al. .............. 712/11 |
| 5,739,664 A | | 4/1998 | Deng et al. |
| 5,977,740 A | | 11/1999 | McCann |
| 6,018,694 A | | 1/2000 | Egami et al. |
| 6,067,586 A | | 5/2000 | Ziegler et al. |
| 6,088,639 A | | 7/2000 | Fayyad et al. |
| 6,271,637 B1 | | 8/2001 | Kushion |
| 6,490,511 B1 | | 12/2002 | Raftari et al. |
| 6,750,626 B2 | | 6/2004 | Leonardi et al. |

(Continued)

FOREIGN PATENT DOCUMENTS

JP 2007166821 A 6/2007

OTHER PUBLICATIONS

Grewe, Tim M. et al., "Defining the General Motors 2-Mode Hybrid Transmission," SAE Technical Papers Series, 2001-01-0273, 2007 World Congress, Apr. 16-19, 2007, 12 pages.
U.S. Appl. No. 12/240,259, filed Sep. 29, 2008, West et al.

(Continued)

*Primary Examiner* — Thomas Tarcza
*Assistant Examiner* — Adam Alharbi (57) ABSTRACT

An inhibit path diagnostic system includes a first control module. The first control module includes a message output and transmits a first message from the message output to a controller area network (CAN) via a message transmission path. An inhibit path circuit includes the message transmission path. A second control module transmits a disable control signal to the inhibit path circuit to disable the message transmission path. The first control module transmits a second message from the message output subsequent to and based on the transmitting of the disable control signal. At least one of the first control module and the second control module detects a fault of the inhibit path circuit subsequent to the transmitting of the second message and based on a feedback signal from the CAN.

21 Claims, 3 Drawing Sheets

(56) References Cited

U.S. PATENT DOCUMENTS

| | | |
|---|---|---|
| 6,914,408 B2 | 7/2005 | Sawada et al. |
| 6,952,795 B2 | 10/2005 | O'Gorman et al. |
| 6,976,388 B2 | 12/2005 | Heap et al. |
| 6,984,954 B2 | 1/2006 | Leonardi et al. |
| 7,071,642 B2 | 7/2006 | Wilton et al. |
| 7,107,488 B2 | 9/2006 | Hashimoto et al. |
| 7,143,314 B2 | 11/2006 | Costin |
| 7,259,530 B2 | 8/2007 | Ochiai et al. |
| 7,471,792 B2 | 12/2008 | Yamamichi et al. |
| 7,545,111 B2 | 6/2009 | Fu et al. |
| 7,664,581 B2 | 2/2010 | Wackerl et al. |
| 7,755,310 B2 | 7/2010 | West et al. |
| 8,013,554 B2 | 9/2011 | West et al. |
| 8,099,179 B2 | 1/2012 | Naik et al. |
| 8,195,370 B2 | 6/2012 | Simon, Jr. et al. |
| 8,386,101 B2 | 2/2013 | West et al. |
| 2006/0036911 A1 | 2/2006 | Costin et al. |
| 2006/0074500 A1 | 4/2006 | Naik et al. |
| 2007/0016340 A1 | 1/2007 | Soudier et al. |
| 2007/0162806 A1 | 7/2007 | Matsumoto et al. |
| 2008/0028012 A1 | 1/2008 | Kato et al. |
| 2008/0059016 A1 | 3/2008 | Mayhew et al. |
| 2008/0177453 A1 | 7/2008 | Costin et al. |
| 2008/0224478 A1 | 9/2008 | Tamor |
| 2009/0071147 A1 | 3/2009 | Wang et al. |
| 2009/0112392 A1 | 4/2009 | Buur et al. |
| 2010/0114424 A1 | 5/2010 | Morris et al. |
| 2010/0138107 A1 | 6/2010 | Morris et al. |
| 2010/0218012 A1* | 8/2010 | Joseph et al. ............ 713/310 |
| 2011/0010032 A1 | 1/2011 | Kozarekar et al. |

OTHER PUBLICATIONS

U.S. Appl. No. 13/150,646, filed Mar. 21, 2011, Faucett et al.

* cited by examiner

CONTROLLER AREA NETWORK MESSAGE TRANSMISSION DISABLE TESTING SYSTEMS AND METHODS

CROSS-REFERENCE TO RELATED APPLICATIONS

This application claims the benefit of U.S. Provisional Application No. 61/424,410, filed on Dec. 17, 2010. The disclosure of the above application is incorporated herein by reference in its entirety.

FIELD

The present disclosure relates to systems that perform diagnostic tests on vehicle control modules.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle control system may include multiple control modules that communicate with each other via a controller area network (CAN). The control modules may include, for example, an engine control module, a transmission control module and a hybrid control module. Each of the control modules may include a primary module and a secondary module. The primary module provides, for example, control over actuators. The secondary module monitors operating states of the primary module.

As an example, the primary module of the engine control module may control throttle, spark, phaser, fuel, and turbo actuators of an engine. The secondary module of the engine control module may monitor the "state of health" of the primary module. The "state of health" of the primary module may refer to whether the primary module is operating appropriately and/or has one or more faults.

The secondary modules may perform diagnostic tests on the primary modules to determine the state of health of the primary modules. The secondary modules may transmit request signals to the primary modules and compare responses from the primary modules to predetermined responses. A fault may be detected when the responses from the primary modules do not match the predetermined responses. The secondary modules may disable the primary modules when a fault is detected and/or when the number of faults detected exceeds a predetermined threshold.

SUMMARY

An inhibit path diagnostic system is provided and includes a first control module. The first control module includes a message output and transmits a first message from the message output to a controller area network (CAN) via a message transmission path. An inhibit path circuit includes the message transmission path. A second control module transmits a disable control signal to the inhibit path circuit to disable the message transmission path. The first control module transmits a second message from the message output subsequent to and based on the transmitting of the disable control signal. At least one of the first control module and the second control module detects a fault of the inhibit path circuit subsequent to the transmitting of the second message and based on a feedback signal from the CAN.

A diagnostic method includes transmitting a first message from a message output of a first control module over the message transmission path to a controller area network (CAN). A disable control signal is generated via a second control module to disable the message transmission path while performing a diagnostic test on at least one of the message transmission path and an inhibit path circuit. The inhibit path circuit includes the message transmission path. The disable control signal is transmitted to the inhibit path circuit subsequent to the transmitting of the first message. A second message is transmitted from the first control module to the CAN subsequent to and based on the transmitting of the disable control signal. A fault associated with the inhibit path circuit is detected based on the feedback signal from at least one of inhibit path circuit and the CAN.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Although the terms first, second, third, etc. may be used herein to describe various elements, modules, and/or components, these elements, modules and/or components should not be limited by these terms. These terms may be only used to distinguish one element, module or component from another element, module or component. Terms such as "first," "second," and other numerical terms when used herein do not imply a sequence or order unless clearly indicated by the context. Thus, a first element, module or component discussed below could be termed a second element, module or component without departing from the teachings of the example embodiments.

A vehicle control system may include a diagnostic system that disables control modules (e.g., processors, ASICs, and/or controllers) based on diagnostic tests performed. A control module and/or corresponding message transmission path disabling hardware and/or software (hereinafter referred to as disabling elements) that are determined to be faulty may be isolated from the rest of the vehicle control system. The remainder of the vehicle control system that is operational may detect the faults associated with the control module and/or disabling elements and perform remedial tasks. Any of the control modules may signal any of the other control modules the faults detected.

The following described implementations include inhibit path diagnostic systems that determine whether hardware and/or software associated with disabling a control module, a portion of a control module, and/or message transmission path of a control module are operating properly. The inhibit path diagnostic system performs inhibit path diagnostic tests and predetermined and/or remedial tasks based on results of the diagnostic tests.

Figure 1:
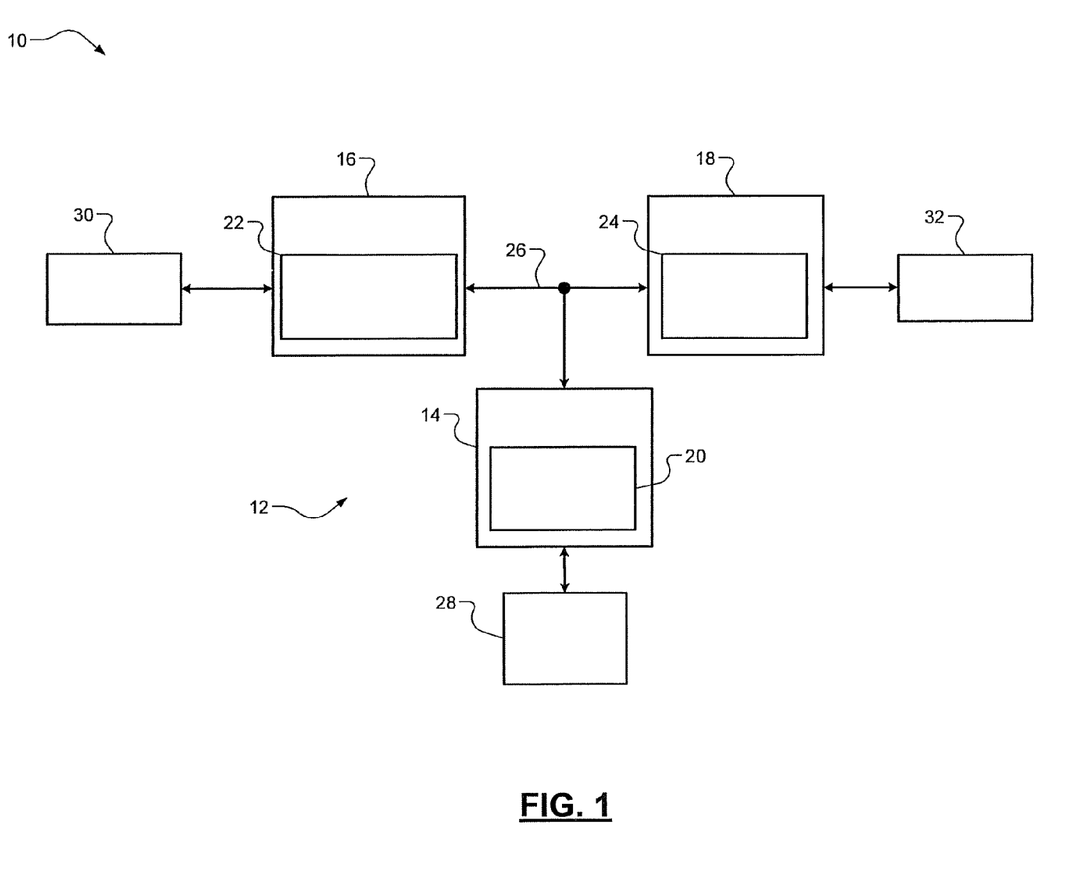
FIG. 1 is a functional block diagram of a torque control system incorporating an inhibit path diagnostic system in accordance with the present disclosure.

In FIG. 1, a torque control system 10 of a vehicle (e.g., an extended range electric vehicle (EREV)) is shown. The torque control system 10 includes an inhibit path diagnostic system 12 and multiple vehicle control modules, such as an engine control module 14 (e.g., an engine controller), a transmission control module 16 (e.g., a transmission controller), and a hybrid control module 18 (e.g., a hybrid controller). Each of the vehicle control modules includes an inhibit path diagnostic module. For example, the control modules 14, 16, 18 respectively include an engine inhibit path diagnostic module 20, a transmission inhibit path diagnostic module 22, and a hybrid inhibit path diagnostic module 24. The inhibit path diagnostic system 12 includes the inhibit path diagnostic modules 20, 22, 24. The inhibit path diagnostic modules 20, 22, 24 test hardware and/or software associated with disabling control modules (e.g., processors and/or ASICs) of the vehicle control modules. Example control modules (of vehicle control modules) are shown in FIG. 2.

The vehicle control modules 14, 16, 18 communicate with each other via a controller area network (CAN) 26. To abstractly refer to the various control mechanisms of the engine 28, the transmission 30 and the electric motor 32, each system that varies a parameter of the engine 28, transmission 30 and/or electric motor 32 may be referred to as an actuator. The control modules 14, 16, 18 may each include various actuators. The engine control module 14 controls operation of an engine 28 including controlling operation of various engine actuators. The engine actuators may include throttle, spark, phaser, fuel, and turbo actuators.

As an example, the engine control module 14 may include a throttle control module, which can adjust a blade position to change an opening area of a throttle valve. The throttle control module can therefore be referred to as an actuator, and the throttle opening area can be referred to as an actuator position. The transmission control module 16 controls operation of a transmission 30 and corresponding actuators. The hybrid control module 18 controls operation of an electric motor (and/or generator) 32 and corresponding actuators. The hybrid control module 18 may be, for example, a belt alternator starter (BAS) power inverter module (BPIM). Another hybrid control module 18 example is a transmission power inverter module (TPIM) used in an EREV.

Figure 2:
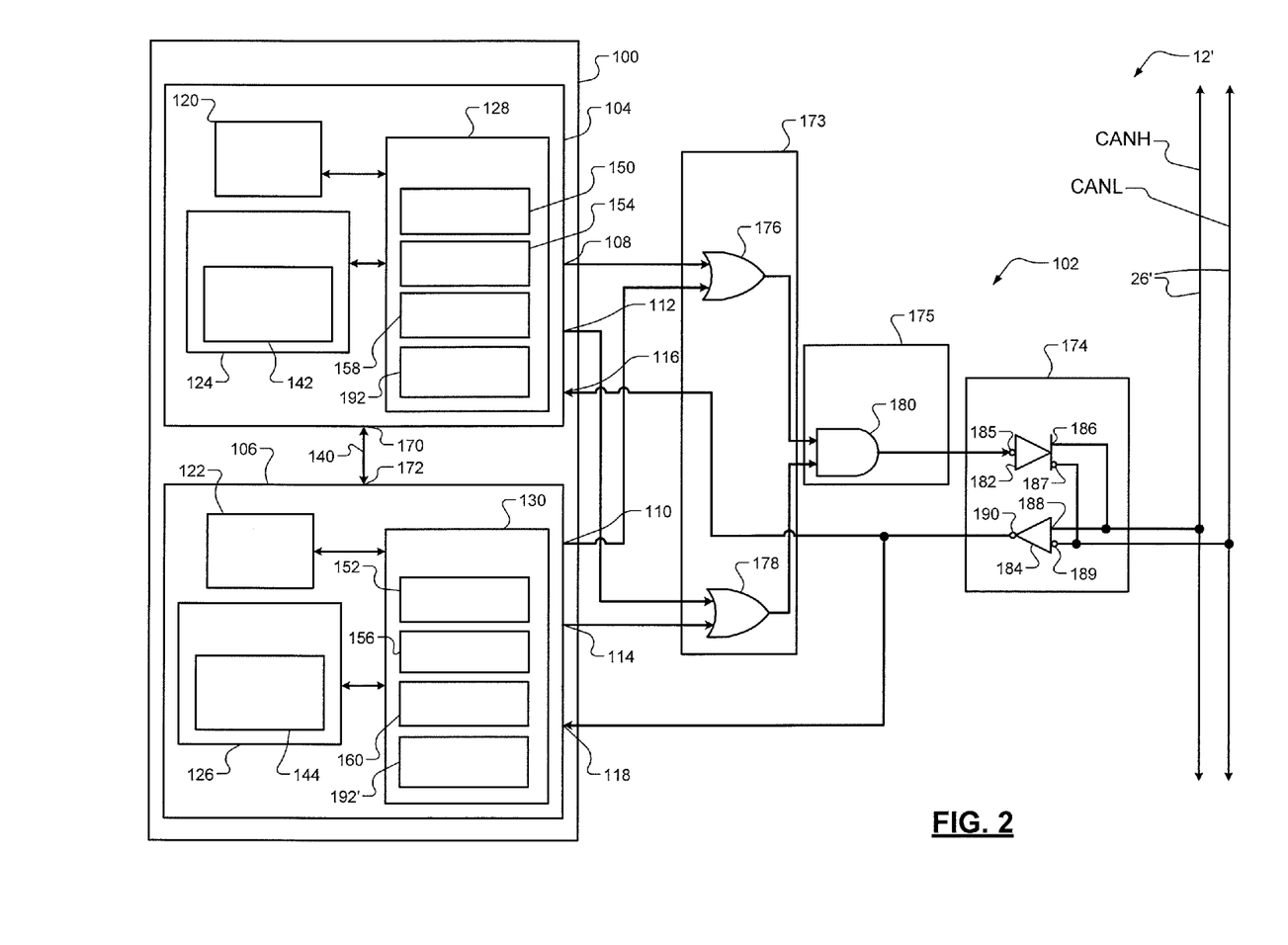
FIG. 2 is a functional block diagram of an inhibit path diagnostic system in accordance with the present disclosure.

In FIG. 2, an inhibit path diagnostic system 12' is shown. The inhibit path diagnostic system 12' includes a vehicle control module 100 (e.g., one of the control modules 14, 16, 18 of FIG. 1), an inhibit path circuit 102 and a CAN 26'. Although one vehicle control module is shown, the inhibit path diagnostic system 12' may include any number of vehicle control modules.

The vehicle control module 100 includes two or more control modules (may be collectively referred to as "the sub-control modules" or may each be referred to as a "sub-control module"). Although the following implementations are primarily described with respect to the control modules of a vehicle control module, the implementations may be applied to distinct control modules that are not part of a vehicle control module.

In the example shown, the control modules of the vehicle control module 100 include a primary control module 104 and a secondary control module 106. In one implementation, the primary control module 104 (e.g., main processor) may control operation of actuators. The secondary control module 106 (e.g., diagnostic monitoring processor) may monitor the "state of health" or operating state of the primary control module 104. The control modules 104, 106 include message outputs 108, 114, disable control outputs 112, 110, and feedback inputs 116, 118. The message outputs 108, 114 are used to transmit messages to the CAN 26'. The disable control outputs 112, 110 are used to disable a message transmission path of other control modules 104, 106. The feedback inputs 116, 118 are used to monitor CAN messages (messages transmitted on the CAN). Each of the sub-control modules (or control modules of a vehicle control module) may monitor CAN messages transmitted by that sub-control module and/or CAN messages transmitted by other sub-control modules of the vehicle control module 100 or other vehicle control modules (collectively "the vehicle control modules").

Each of the sub-control modules may monitor the state of health and/or the disabling elements associated with the other sub-control modules of the vehicle control modules. CAN message transmission of sub-control module(s) that have associated faults is disabled. The faults may include faults of the sub-control module(s) and/or faults of corresponding disabling elements. The sub-control module(s) with faults may self-disable and/or be disabled via one or more of the other sub-control modules of the vehicle control modules.

The control modules 104, 106 include respective health monitoring modules 120, 122, system remedial action (SRA) modules 124, 126 and memories 128, 130. Each of the health monitoring modules 120, 122 may monitor the state of health (or operating state) and perform a diagnostic test on any of the control modules of the vehicle control modules including the control modules 104, 106.

As an example, the health monitoring module 122 may perform a diagnostic test on the primary control module 104 to determine the state of health of the primary control module 104. The health monitoring module 122 may transmit request signals to the health monitoring module 120 and compare responses from the health monitoring module 120 to predetermined responses. The request signals and response signals may be transmitted over a peer interface 140 between the control modules 104, 106. A fault may be detected when the responses from the health monitoring module 120 do not match the predetermined responses. The secondary control module 106 may disable the primary control module 104 when a fault is detected and/or when the number of faults detected exceeds a predetermined threshold.

The SRA modules 124, 126 perform tasks based on diagnostic tests. The SRA modules 124, 126 include respective inhibit path diagnostic module 142, 144. The inhibit path diagnostic modules 142, 144 perform inhibit path tests to determine whether hardware and/or software associated with disabling message transmission paths of the control modules 104, 106 is operating properly or is faulty. A message transmission path includes the hardware between a message output of a control module of a vehicle control module and a CAN. For example, the inhibit path diagnostic modules 142, 144 may perform an inhibit path diagnostic test to determine if the hardware and/or software associated with disabling the message transmission path of the primary control module 104 is operating properly or is faulty. The message path of the primary control module 104 includes the hardware of the inhibit path circuit 102 between the message output 108 and the CAN 26'. An example of this inhibit path diagnostic test is described with respect to the method of FIG. 3.

Each of the memories 128, 130 may store inhibit path test software 150, 152, inhibit path data 154, 156, and inhibit path test frames 158, 160. The inhibit path test software 150, 152 may include inhibit path test algorithms and may be executed by the inhibit path diagnostic modules 142, 144. Results of the inhibit path diagnostic tests may be saved as the inhibit path data 154, 156 and stored in the memories 128, 130. The inhibit path data 154, 156 may be shared between any of the above-stated sub-control modules and/or vehicle control modules ("the control modules"). Based on the inhibit path data 154, 156, the control modules may perform remedial tasks. Although the control modules 154, 156 are shown as including distinct and dedicated memories (i.e. memories 128, 130), the information, data and/or software stored in the memories 128, 130 may be stored in a single shared memory and accessed by the control modules 154, 156. The single shared memory may be part of one of the control modules 154, 156 or distinct from the control modules 154, 156.

The remedial tasks may include: executing a self shutdown procedure; executing shutdown and/or disabling of one or more control modules of vehicle control modules (i.e. sub-control modules); indicating faults of a sub-control module to other sub-control modules; refraining from executing certain procedures (or algorithms) that rely on messages from a sub-control module with associated faults; executing backup procedures (or algorithms), and/or using predetermined or modeled values as alternatives to relying on the messages and/or values generated by the sub-control modules with associated faults. The associated faults may include faults internal to the sub-control modules and/or faults associated with disabling a message transmission path. The memories 128, 130 may include volatile memory, non-volatile memory, random access memory (RAM), flash memory, etc.

The inhibit path test frames 158, 160 of a control module of a vehicle control module may represent or be similar to messages typically transmitted by the sub-control module. The inhibit path test frames 158, 160 may be predetermined frames with fixed values and/or may be frames generated and stored during operation of the sub-control module.

The control modules 104, 106 include respective peer outputs 170, 172 for communicating directly with each other via the peer interface 140. The peer interface 140 may be, for example, a serial peripheral interface (SPI). During an inhibit path diagnostic test, signals may be transmitted between the control modules 104, 106. The signals may include diagnostic test request messages, diagnostic test response messages, test coordinating signals, timing synchronization signals, diagnostic test initiation signals, diagnostic test result signals, state of operation signals of a control module of a vehicle control module, etc. The test coordinating signals, timing synchronization signals, and diagnostic test initiation signals may be transmitted to indicate when: to start an inhibit path diagnostic test; disable control signals have been transmitted via the disable control outputs; messages are transmitted via the message outputs; messages have been received via the feedback inputs; etc. The diagnostic test results may indicate: when a fault of a control module of a vehicle control module and/or a fault of associated disabling elements are detected; the type of the fault; and/or other information describing the fault.

The inhibit path circuit 102 provides a feedback loop for each of the control modules 104, 106 and may include a message passing circuit 173, an active combining circuit 175 and a CAN transceiver module 174. The circuits 173, 175 may include logic gates, as shown. An OR gate may be provided for each control module of a vehicle control module (i.e. sub-control module) connected to the inhibit path circuit 102. In the example shown, the message passing circuit 173 includes OR gates 176 and 178 with respective output signals. Each of the OR gates 176, 178 receives a transmitted message from a respective one of the sub-control modules and a disable control signal from one or more of the other sub-control modules.

In the example shown, the first OR gate 176 receives a first transmitted message from the primary control module 104 and a second disable control signal from the secondary control module 106. The second OR gate 178 receives a second transmitted message from the secondary control module 106 and a first disable control signal from the primary control module 104. Although two sub-control modules are shown as being connected to the OR gates, any number of sub-control modules may be included in the vehicle control module 100 and connected to the OR gates 176, 178. Each of the sub-control modules may have a respective OR gate. Each of the OR gates receives a transmission signal from a respective one of the sub-control modules and disable control signals from the other sub-control modules.

Each of the OR gates 176, 178 are used to pass a transmitted message from one of the control modules 104, 106 when the corresponding disable control signal is LOW (indicating passage enabled) and to prevent passage of the transmitted message when the disable control signal is HIGH (indicating passage disabled). For example, the first OR gate 176 passes the first transmitted message when the second disable control signal is LOW and prevents passage of the first transmitted message when the second disable control signal is HIGH. The first and second transmitted messages may contain ACTIVE bits or PASSIVE bits. An ACTIVE bit may refer to a 0 (or LOW) bit. A PASSIVE bit may refer to a 1 (or HIGH) bit.

The active combining circuit 175 includes an AND gate 180 with inputs and an output. The inputs of the AND gate 180 are connected to the outputs of the OR gates 176, 178 and/or receive output signals from the OR gates 176, 178. An output signal of the AND gate 180 is provided to the CAN transceiver module 174. If the control modules 104, 106 attempt to transmit messages at the same time, the transmitted bit that is ACTIVE is passed to the CAN 26' due to the AND gate 180. The transmitted bit that is PASSIVE is not passed to the CAN 26'. The sub-control module that is not transmitting an ACTIVE signal may detect an ACTIVE signal on the CAN 26' via a feedback input, determine that another sub-control module is transmitting messages on the CAN 26', and refrain from continuing to transmit messages to the CAN 26'.

Put another way, by monitoring the CAN 26' via the feedback inputs 116, 118, the control modules 104, 106 are able to detect when other sub-control modules are transmitting messages. The control modules 104, 106 may refrain from and/or postpone transmitting messages until other sub-control modules finish transmitting messages. For example, the secondary control module 106 may refrain from transmitting a message when the primary control module 104 is transmitting a message.

The CAN transceiver module 174 may include two buffers 182, 184. The first buffer 182 may have a first inverting input 185, a first non-inverting output 186, and a first inverting output 187. The second buffer 184 may include a first non-inverting input 188, a second inverting input 189, and a second inverting output 190. The first inverting input 185 is connected to the output of the AND gate 180 and/or receives an output signal from the AND gate 180. The first non-inverting output 186 and the first inverting output 187 are connected to and/or provide CAN messages in the form of a differential signal to differential CAN bus lines CANH, CANL. As a result, the CAN transceiver module 174 operates as a non-differential signal to differential signal converter between the output of the AND gate 180 and the differential CAN bus lines CANH, CANL. The CAN transceiver module 174 operates as a differential signal converter to non-differential signal converter between the differential CAN bus lines CANH, CANL and the feedback inputs 116, 118.

The CAN signals on the differential CAN bus lines CANH, CANL together provide a differential signal. The first non-inverting input 188 and the second inverting input 189 receive the differential signal. The first non-inverting input 188 is connected to and receives the CAN signal on the CAN bus line CANH. The second inverting input 189 is connected to and receives the CAN signal on the CAN bus line CANL. The second inverting output 190 is connected to and/or provides a feedback signal (a non-differential signal) to the feedback inputs 116, 118.

The vehicle control module 100 and/or the control modules 104, 106 may store one or more inhibit path diagnostic flags 192, 192'. As shown, the inhibit path diagnostic flags 192, 192' may be stored in the memories 128, 130 or may be stored in memory of the vehicle control module 100. The inhibit path diagnostic flags 192, 192' may have the same value and/or state and may be accessed via the control modules 104, 106 and/or the inhibit path diagnostic modules 142, 144. The inhibit path diagnostic flags 192, 192' may refer to binary or HIGH/LOW bits that indicate whether to initiate an inhibit path diagnostic test. The inhibit path diagnostic flags 192, 192' may be set when normal periodic communication of messages on the CAN 26' is disabled. The normal periodic communication of messages may refer to the transmitting of signals over the CAN 26' between sub-control modules and/or vehicle control modules during operation of a vehicle.

Although a single inhibit path circuit and pair of CAN bus lines are shown, the control modules of the vehicle control module 100 may be connected to multiple inhibit path circuits and/or multiple sets of CAN bus lines. Each of the inhibit path circuits may be similar to the inhibit path circuit 102, connected to each of the sub-control modules, and connected to a respective pair of bus lines. The sub-control modules may test each of the inhibit path circuits separately (i.e. during different periods of time) or during the same period of time. A first inhibit path circuit may be tested while another inhibit path circuit is tested.

Figure 3:
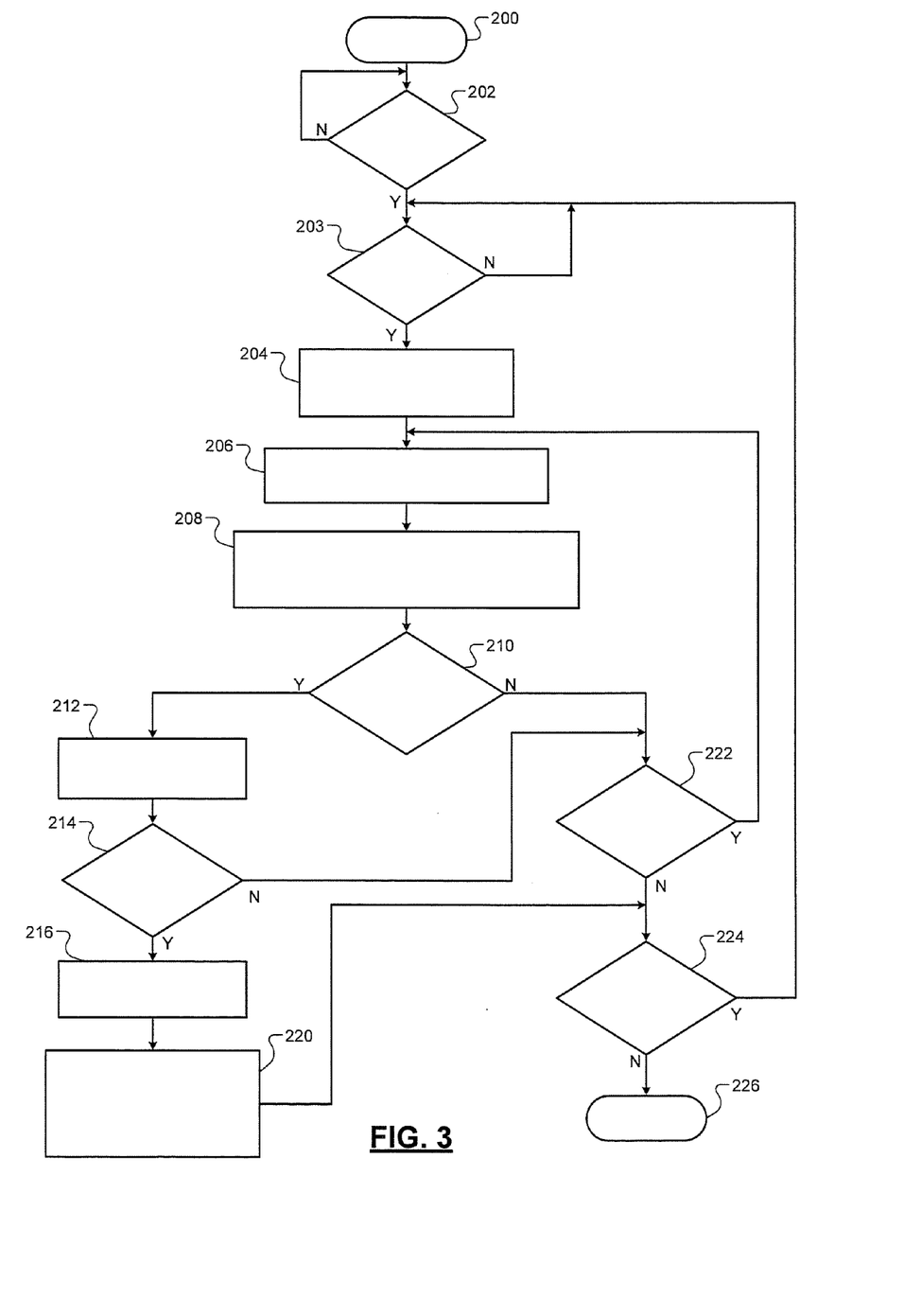
FIG. 3 illustrates an inhibit path diagnostic method in accordance with the present disclosure.

In FIG. 3, an inhibit path diagnostic method is shown. The inhibit path diagnostic system 12' may be operated using numerous methods; an example method is provided by the method of FIG. 3. Although the following tasks are primarily described with respect to the implementations of FIGS. 1 and 2, the tasks may be easily modified to apply to other implementations of the present disclosure. Although the tasks are described primarily as being performed by certain control modules of vehicle control modules (i.e. sub-control modules), the tasks may be executed by the inhibit path diagnostic modules of the identified sub-control modules. The tasks may also be iteratively performed. The method may begin at 200.

At 202, the sub-control modules of the vehicle control module 100 (e.g., the control modules 104, 106) may detect whether inhibit path diagnostic flags (e.g., the inhibit path diagnostic flags 192, 192') are set. This may occur, for example, after to a "key-OFF" event. A key-OFF event may refer to when a state of a shutdown switch indicates to initiate a shutdown procedure of a vehicle. This may occur, for example, when a vehicle operator rotates a key cylinder and/or actuates a vehicle shutdown switch to shutdown the vehicle. The inhibit path diagnostic test may be performed when the normal periodic communication of messages has been disabled.

Performing the inhibit path diagnostic test when normal periodic communication of messages has been disabled prevents interference between vehicle control module signals and between inhibit path diagnostic test messages and/or other messages on a CAN (e.g., the CAN 26'). For example, a first vehicle control module may wait to perform an inhibit path diagnostic test until other vehicle control modules have completed transmitting messages over the CAN to prevent interference between messages.

The inhibit path diagnostic test may be performed prior to and/or subsequent to detection of a fault associated with a sub-control module. The inhibit path diagnostic flags may be set prior to and/or subsequent to, for example, detecting the state of health of a sub-control module. As a result, the inhibit path diagnostic test may be initiated prior to and/or subsequent to performing a state of health diagnostic test. While a state of health diagnostic test is performed, a health monitoring module may detect a fault of a sub-control module and activate the inhibit path to prevent the faulted sub-control module from transmitting messages on the CAN. The inhibit path diagnostic test may be initiated to assure that hardware and/or software associated with disabling CAN message transmissions (disabling elements) of a sub-control module are operating appropriately.

The inhibit path diagnostic flags may also be set when, for example, a sub-control module detects that CAN message transmission of a faulty sub-control module has not been disabled. The faulty sub-control module and/or a non-faulty sub-control module may detect that the CAN message transmission has not been disabled and set the inhibit path diagnostic flags.

The inhibit path diagnostic flags may be set by one or more of the inhibit path diagnostic modules (e.g., the inhibit path diagnostic modules 142, 144) and/or in response to a request from one or more of the inhibit path diagnostic modules.

At 203, availability flags may be tested to determine whether the feedback loop associated with inhibit path test frames is operating properly. Each availability flag may refer to a bit stored in memory and be associated with a respective one or more of the inhibit path test frames. The availability flags may indicate whether the inhibit path test frames are received by the feedback inputs (e.g., the feedback inputs 116, 118) of a sub-control module to be tested (sub-control module under test). The availability flags may be stored in the memories as part of the inhibit path data (e.g., the inhibit path data 154, 156).

For example, a first control module (i.e. the primary control module 104) may transmit the inhibit path test frames via a message output of the sub-control module to the CAN. The sub-control module under test (i.e. the secondary control module 106) may activate the inhibit path while the first control module verifies that the CAN message has been successfully blocked by the sub-control module under test.

If the feedback signal matches the inhibit path test frame transmitted then the availability flag for that inhibit path test frame may be set and a bus OFF condition is not indicated. When the feedback signal does not match the inhibit path test frame, the availability flag is cleared and the bus OFF condition is indicted by the sub-control module under test. If the first condition applies for the first message and the second condition applies for the second message, the inhibit path test has passed. Otherwise, the inhibit path test has failed and the sub-control module under test and/or other sub-control modules may perform remedial tasks based on the failure of the inhibit path test. The remedial tasks may include disabling the sub-control module under test and/or one or more of the other sub-control modules. Other example remedial tasks are stated above.

Task 204 may be performed when the inhibit path diagnostic flags are set. At 204, the sub-control module under test is selected and one or more diagnostic monitoring modules (or sub-control modules other than the sub-control module under test, such as the secondary control module 106) generate a disable control signal. The sub-control module under test may be any one of the sub-control modules of the vehicle control module 100. The diagnostic monitoring modules may include any of the sub-control modules of the vehicle control module 100 or of other vehicle control modules, other than the sub-control module under test.

The disable control signals are transmitted via the respective disable control outputs to the OR gate (e.g., the OR gate 176) of the sub-control module under test. The diagnostic monitoring modules may indicate via one or more peer interfaces that the disable control signals have been transmitted and/or that the disable control outputs of the diagnostic monitoring modules have transitioned from a LOW or ENABLE state to a HIGH or DISABLE state. The disable control signals are generated to isolate the sub-control module under test from the other sub-control modules and the CAN.

At 206, the sub-control module under test transmits one or more inhibit path test frames (or test message) via the message output to the OR gate. The sub-control module under test may indicate that the test message has been transmitted to the diagnostic monitoring modules via the peer interfaces. The inhibit path test frames may represent or be similar to messages typically transmitted by the sub-control module under test. The inhibit path test frames may be predetermined frames and/or frames generated during the operation of the sub-control module and stored in the memory of the sub-control module under test.

Each of the inhibit path test frames may be assigned a dedicated receive message object by the sub-control modules under test and have an associated parse routine. The dedicated receive message object and the parse routine may be used to set the availability flags. The availability flags may indicate whether the inhibit path test frames are received by the feedback inputs. The dedicated receive message object may be a dedicated filter parameter corresponding to a particular inhibit path test frame or set of inhibit path test frames. The filter parameters may be used by the sub-control modules (or receivers of the sub-control modules) to filter out CAN messages other than the inhibit path test frames. This allows the inhibit path test frames to be detected when passed to the feedback inputs. The parse routine may be used to provide the dedicated receive message object, the feedback signals and/or portions of the feedback signals from the feedback inputs to assigned modules within the sub-control modules.

At 208, the sub-control module under test and/or the diagnostic monitoring modules may monitor feedback signals received from the CAN via the feedback inputs. The feedback signals are monitored to detect whether transmitted messages have been blocked. The transmitted messages may be blocked at the OR gate of the sub-control module under test. Blocking of the transmitted messages prevents the transmitted messages from being fed back to the feedback inputs. A fault in the sub-control module under test and/or in the hardware (e.g., the inhibit path circuit 102 of FIG. 2) associated with disabling message transmission is detected when a message has not been blocked.

The diagnostic monitoring modules may detect lack of CAN messages from the sub-control module under test on the CAN. This may occur when the feedback signals received by the diagnostic monitoring modules do not match a message transmitted by the sub-control module under test, the state of the feedback signals remain passive for a predetermined period, the state of the feedback input does not change from a passive state when expected, etc. For example, the diagnostic monitoring module may receive a signal via a peer interface indicating that the sub-control module has transmitted a message over the CAN. The diagnostic monitoring module may then monitor a feedback input of the diagnostic monitoring module to detect the message transmitted. If the state of the feedback input remains passive (or HIGH), then the message was not received. Vehicle control modules other than the vehicle control module of the sub-control module under test may also detect lack of CAN messages from the sub-control module under test.

At 210, the sub-control module under test and/or the diagnostic monitoring modules determine whether a fault has been detected. A fault may be detected when a feedback signal matches a corresponding inhibit path test frame. A match between the feedback signal and a corresponding inhibit path test frame indicates that disablement of message transmission of the sub-control module under test has failed. If the feedback signal does not match a corresponding inhibit path test frame, then there is a loss in availability of the transmitted message (availability flag set to LOW or FALSE) and a bus OFF condition is indicated. A bus OFF condition results due to a loss in arbitration of the CAN bus by the sub-control module under test and/or by CAN hardware/software of the sub-control module under test. The CAN hardware/software may be included in the sub-control module under test and is associated with transmitting messages to the CAN. This may be detected, for example, when the transmitted message includes an ACTIVE or DOMINATE bit (e.g., 0 bit) and the feedback signal received is an INACTIVE or PASSIVE bit (e.g., 1 bit).

If the feedback signal does match a corresponding inhibit path test frame, then there is not a loss in availability of the transmitted message (availability flag set to HIGH or TRUE) and a bus ON condition is indicated. The availability of the transmitted message and the bus conditions may be transmitted between the sub-control modules via the peer interfaces. A diagnostic pass may be indicated when there is a loss in availability of the transmitted message and a bus OFF condition exists. Task 212 is performed when a fault has been detected, an availability flag is set and/or a bus OFF is not set, otherwise task 222 is performed.

At 212, the number of faults detected may be incremented. As an example a fault counter value of one or more of the sub-control modules may be incremented. The fault counter value may be stored as part of the inhibit path data in the memories. The fault counter value may be reset: prior to and/or during each inhibit path diagnostic test; at predetermined intervals; when a fault is no longer detected for a predetermined period and/or for a predetermined number of diagnostic tests; and/or subsequent to a repair of the fault(s) associated with the sub-control module under test.

At 214, the sub-control module under test and/or the diagnostic monitoring modules may determine whether the number of faults (or the fault counter value) is greater than a predetermined number. Task 216 may be performed when the number of faults is greater than the predetermined number, otherwise task 222 is performed.

At 216, the sub-control module under test may self disable and/or the diagnostic monitoring modules may disable the sub-control module under test. This may include disabling the message output of the sub-control module under test and/or other portions of the sub-control module under test. A shutdown of the whole sub-control module under test may be performed. This may include transmitting disable signals via the peer interfaces.

At 220, the diagnostic monitoring modules and the vehicle control modules may perform remedial tasks based on the failure of the Inhibit Path to block the CAN messages from the sub-control module. Example remedial tasks are stated above. The remedial tasks may include the diagnostic monitoring modules generating diagnostic result signals. The diagnostic result signals may be transmitted from the diagnostic monitoring modules to the sub-control module under test and/or to other sub-control modules via the peer interfaces. The diagnostic result signals may indicate the detected faults, identify the sub-control module under test, indicate types of the faults, etc.

At 222, the sub-control module under test and/or the diagnostic monitoring modules determine whether there is another inhibit path test frame to transmit. If there is another inhibit path test frame to transmit, task 206 is performed, otherwise task 224 is performed.

At 224, the sub-control module under test and/or the diagnostic monitoring modules determine whether there is another sub-control module to test. Put another way, the sub-control module under test and/or the diagnostic monitoring modules determine whether there is another set of disable hardware and/or software to test. If there is another test to be performed, task 203 is performed, otherwise the method may end at 226.

The above-described tasks are meant to be illustrative examples; the tasks may be performed sequentially, synchronously, simultaneously, continuously, during overlapping time periods or in a different order depending upon the application. For example, task 206 may be performed while task 204 is performed.

The above described implementations test functionality of CAN transmission disable hardware and/or software via CAN transmission disable monitors (e.g., sub-control module under test and/or diagnostic monitoring modules). The CAN transmission disable monitors monitor feedback signals from a CAN via associated receiver hardware. The CAN transmission disable monitors determine whether CAN transmission messages are transmitted on the CAN when CAN transmission is disabled based on the feedback signals. The above-described implementations provide secure distributed control systems while minimizing added complexity associated with disabling control modules and diagnosing faults associated with the hardware and/or software involved in the disablement.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An inhibit path diagnostic system comprising:
    a first control module that comprises a message output and transmits a first message from the message output to a controller area network (CAN) via a message transmission path;
    an inhibit path circuit that includes the message transmission path; and
    a second control module that transmits a disable control signal to the inhibit path circuit to disable the message transmission path,
    wherein the first control module transmits a second message from the message output subsequent to and based on the transmitting of the disable control signal, and
    wherein at least one of the first control module and the second control module detects a fault of the inhibit path circuit subsequent to the transmitting of the second message and based on a feedback signal from the CAN.

2. The inhibit path diagnostic system of claim 1, wherein the second control module generates the disable control signal to disable the message transmission path while performing a diagnostic test on at least one of the message transmission path and the inhibit path circuit.

3. The inhibit path diagnostic system of claim 1, wherein the second control module detects the fault subsequent to the transmitting of the second message and based on the feedback signal from the CAN.

4. The inhibit path diagnostic system of claim 1, further comprising:
    a vehicle control module, wherein the vehicle control module comprises the first control module and the second control module;
    a first memory that stores inhibit path test frames;
    a first diagnostic module that accesses the inhibit path test frames and generates the second message to include at least one of the inhibit path test frames;
    a second memory that stores inhibit path test software; and
    a second diagnostic module that executes the inhibit path test software to determine whether the feedback signal includes the second message.

5. The inhibit path diagnostic system of claim 4, wherein:
the first control module comprises
    the first memory, and the first diagnostic module; and
the second control module comprises
the second memory, and
the second diagnostic module.

6. The inhibit path diagnostic system of claim 1, wherein at least one of the first control module and the second control module determines whether the feedback signal includes the second message and detects the fault when the feedback signal includes the second message.

7. The inhibit path diagnostic system of claim 1, wherein the inhibit path circuit comprises:
a message passing circuit that prevents passing the second message to the CAN based on the disable control signal; and
a CAN transceiver module that generates the feedback signal based on the second message transmitted from the first control module.

8. The inhibit path diagnostic system of claim 7, further comprising an active combining circuit that passes one of a plurality of output signals to the CAN transceiver module, wherein the one of the plurality of output signals is an active signal.

9. The inhibit path diagnostic system of claim 8, wherein the CAN transceiver module generates a differential CAN signal based on at least one of the second message and output of the active combining circuit.

10. The inhibit path diagnostic system of claim 8, wherein:
the message passing circuit comprises an OR gate that receives the second message and the disable control signal; and
the active combining circuit comprises an AND gate that receives the one of the plurality of output signals, wherein the one of the plurality of output signals is generated based on the output of the OR gate.

11. The inhibit path diagnostic system of claim 7, wherein the CAN transceiver module comprises:
a first buffer that generates a differential CAN signal based on the second message; and
a second buffer that generates the feedback signal based on the differential CAN signal.

12. The inhibit path diagnostic system of claim 7, wherein:
the CAN transceiver module generates the feedback signal based on a differential CAN signal; and
the feedback signal includes the second message.

13. A diagnostic method comprising:
transmitting a first message from a message output of a first control module over a message transmission path to a controller area network (CAN);
generating a disable control signal via a second control module to disable the message transmission path while performing a diagnostic test on at least one of the message transmission path and an inhibit path circuit, wherein the inhibit path circuit includes the message transmission path;
transmitting the disable control signal to the inhibit path circuit subsequent to the transmitting of the first message;
transmitting a second message from the first control module to the CAN subsequent to and based on the transmitting of the disable control signal; and
detecting a fault associated with the inhibit path circuit based on a feedback signal from at least one of inhibit path circuit and the CAN.

14. The method of claim 13, further comprising disabling the first control module based on a number of faults detected with the inhibit path circuit.

15. The method of claim 13, further comprising:
detecting that the feedback signal does not include the second message via at least one of the first control module and the second control module; and
performing a remedial action based on detection of the second message in the feedback signal, wherein the remedial action includes adjusting operation of the second control module.

16. The method of claim 13, wherein the fault is detected via the second control module and subsequent to the transmitting of the second message and based on the feedback signal from the CAN.

17. The method of claim 13, further comprising:
storing inhibit path test frames in a first memory of the first control module;
accessing the inhibit path test frames and generating the second message to include at least one of the inhibit path test frames via a first diagnostic module of the first control module;
storing inhibit path test software in a second memory of the second control module; and
executing the inhibit path test software to determine whether the feedback signal includes the second message via a second diagnostic module of the second control module.

18. The method of claim 17, further comprising:
determining whether the feedback signal includes the inhibit path test frames; and
detecting the fault based on whether the feedback signal includes the inhibit path test frames.

19. The method of claim 13, further comprising:
determining whether the feedback signal includes the second message via at least one of the first control module and the second control module; and
detecting the fault when the feedback signal includes the second message.

20. The method of claim 13, further comprising:
preventing passage of the second message to the CAN based on the disable control signal;
generating a plurality of output signals based on output signals of the first control module and the second control module, wherein one of the output signals includes the second message based on the disable control signal;
generating a differential signal based on the plurality of output signals; and
generating the feedback signal based on the differential signal.

21. The inhibit path diagnostic system of claim 1, wherein:
the first control module transmits the second message from the message output to test whether the inhibit path circuit is disabled;
the second control module transmits the disable control signal to prevent the second message from being fed back to the first control module or the second control module; and
the feedback signal (i) matches the second message if the inhibit path circuit is not disabled based on the disable control signal; and (ii) does not match the second message if the inhibit path circuit is disabled based on the disable control signal.

* * * * *